United States Patent
Hong et al.

(10) Patent No.: US 8,861,143 B2
(45) Date of Patent: Oct. 14, 2014

(54) SUSPENSION FOR COMPENSATING SLIDER ATTITUDE

(75) Inventors: Eo Jin Hong, Gyeonggi-do (KR); Young Bae Chang, Seoul (KR); Woo Sung Kim, Seoul (KR)

(73) Assignee: Seagate Technology LLC, Cupertino, CA (US)

( * ) Notice: Subject to any disclaimer, the term of this patent is extended or adjusted under 35 U.S.C. 154(b) by 102 days.

(21) Appl. No.: 13/435,515

(22) Filed: Mar. 30, 2012

(65) Prior Publication Data

US 2012/0268841 A1 Oct. 25, 2012

(30) Foreign Application Priority Data

Mar. 30, 2011 (KR) ........................ 10-2011-0028943

(51) Int. Cl.
G11B 5/56 (2006.01)
G11B 21/16 (2006.01)
G11B 5/48 (2006.01)

(52) U.S. Cl.
CPC ..................................... *G11B 5/482* (2013.01)
USPC ........................................ 360/294.4; 360/245

(58) Field of Classification Search
CPC .... G11B 5/4833; G11B 5/486; G11B 5/4826; G11B 5/6005; G11B 5/4873; G11B 5/4853; G11B 5/5552; G11B 5/596; G11B 5/482
See application file for complete search history.

(56) References Cited

U.S. PATENT DOCUMENTS

| | | | |
|---|---|---|---|
| 5,956,209 A * | 9/1999 | Shum .......................... | 360/244.3 |
| 6,246,552 B1 * | 6/2001 | Soeno et al. ................ | 360/294.4 |
| 6,376,964 B1 * | 4/2002 | Young et al. ................... | 310/311 |
| 6,381,104 B1 * | 4/2002 | Soeno et al. ................ | 360/294.4 |
| 6,697,228 B1 | 2/2004 | Mei et al. | |
| 6,704,158 B2 * | 3/2004 | Hawwa et al. .............. | 360/77.16 |
| 6,724,580 B2 * | 4/2004 | Irie et al. ..................... | 360/294.4 |
| 6,738,231 B2 * | 5/2004 | Arya et al. .................. | 360/294.4 |
| 6,754,047 B2 * | 6/2004 | Pan et al. .................... | 360/294.4 |
| 6,765,766 B2 * | 7/2004 | Wissman et al. ........... | 360/294.5 |
| 7,068,473 B2 * | 6/2006 | O'Neill ....................... | 360/294.4 |
| 7,068,474 B2 * | 6/2006 | Kuwajima et al. .......... | 360/294.4 |
| 7,099,115 B2 * | 8/2006 | Yao et al. .................... | 360/244.7 |
| 7,152,303 B2 * | 12/2006 | Childers et al. ............ | 29/603.06 |
| 7,156,500 B2 * | 1/2007 | Murai et al. ..................... | 347/68 |
| 7,230,800 B2 | 6/2007 | Hirano et al. | |
| 7,245,457 B2 | 7/2007 | Kuroki et al. | |
| 7,317,595 B2 * | 1/2008 | Tsuchida et al. ............ | 360/245.3 |
| 7,375,930 B2 * | 5/2008 | Yang et al. .................. | 360/294.4 |
| 7,420,785 B2 * | 9/2008 | Yamazaki et al. .......... | 360/294.4 |
| 7,551,386 B2 * | 6/2009 | Yao et al. ......................... | 360/75 |
| 7,604,331 B2 * | 10/2009 | Saito ................................ | 347/71 |
| 7,667,930 B1 | 2/2010 | Wang | |
| 7,764,467 B2 | 7/2010 | Hanya et al. | |
| 7,852,604 B2 * | 12/2010 | Sassine ........................ | 360/245.3 |
| 8,085,506 B1 * | 12/2011 | Ee et al. ....................... | 360/245.8 |

(Continued)

*Primary Examiner* — Brian Miller (74) *Attorney, Agent, or Firm* — Leanne Taveggia Farrell; Westman, Champlin & Koehler, P.A.

(57) ABSTRACT

Disclosed is an assembly located in a memory device. The assembly includes: a suspension including a flexure to which a slider is coupled and a load beam disposed at an upper part of the flexure. The assembly also includes at least one piezoelectric film coupled to the suspension and configured to control at least one of an angle between the load beam and the flexure in a pitching direction and an angle between the load beam and the flexure in a rolling direction by being extended or contracted when electrical current is applied thereto.

18 Claims, 6 Drawing Sheets

(56) References Cited

U.S. PATENT DOCUMENTS

| | | | |
|---|---|---|---|
| 8,089,731 B1 * | 1/2012 | Ma et al. | 360/245.3 |
| 8,125,741 B2 * | 2/2012 | Shelor | 360/294.4 |
| 8,159,786 B2 * | 4/2012 | Yao et al. | 360/245.9 |
| 8,189,301 B2 * | 5/2012 | Schreiber | 360/294.4 |
| 8,194,359 B2 * | 6/2012 | Yao et al. | 360/294.4 |
| 8,289,654 B2 * | 10/2012 | Kuwajima | 360/254 |
| 8,310,790 B1 * | 11/2012 | Fanslau, Jr. | 360/294.4 |
| 8,322,830 B2 * | 12/2012 | Takakuwa | 347/71 |
| 8,441,761 B1 * | 5/2013 | Hahn et al. | 360/245.9 |
| 8,446,694 B1 * | 5/2013 | Tian et al. | 360/245 |
| 8,605,389 B1 * | 12/2013 | Pan et al. | 360/245.9 |
| 2002/0071969 A1 * | 6/2002 | Qiu et al. | 428/697 |
| 2004/0125509 A1 * | 7/2004 | Yang et al. | 360/294.3 |
| 2005/0286176 A1 * | 12/2005 | Yao et al. | 360/294.4 |
| 2007/0230060 A1 * | 10/2007 | Yao et al. | 360/294.4 |
| 2007/0291419 A1 | 12/2007 | Lee et al. | |
| 2008/0198511 A1 * | 8/2008 | Hirano et al. | 360/294.4 |
| 2008/0297948 A1 * | 12/2008 | Yao | 360/294.4 |
| 2009/0109568 A1 | 4/2009 | Hernandez et al. | |
| 2009/0268345 A1 * | 10/2009 | Koganezawa | 360/234.6 |
| 2009/0268347 A1 | 10/2009 | Muraki et al. | |
| 2011/0096438 A1 | 4/2011 | Takada et al. | |
| 2011/0109701 A1 * | 5/2011 | Ohashi | 347/68 |
| 2011/0228013 A1 * | 9/2011 | Ohashi et al. | 347/68 |
| 2013/0250007 A1 * | 9/2013 | Ishimori et al. | 347/70 |

* cited by examiner

SUSPENSION FOR COMPENSATING SLIDER ATTITUDE

CROSS-REFERENCE TO RELATED APPLICATIONS

This application claims the benefit of Korean Patent Application No. 10-2011-0028943, filed with the Korean Intellectual Property Office on Mar. 30, 2011, the disclosure of which is incorporated herein by reference in its entirety.

FIELD OF THE DISCLOSURE

Embodiments of the present disclosure relate to a head gimbal assembly and a hard disk drive having the same, and particularly, to a head gimbal assembly capable of actively controlling an attitude of a slider for stable flying of the slider, and a hard disk drive having the same.

BACKGROUND OF THE DISCLOSURE

A hard disk drive (HDD) is a device for recording on a disc or records data onto the disc using a read/write head. The hard disc drive is being widely used as an auxiliary memory device of a computer system owing to its capability to access a great amount of data at a high speed.

Generally, the HDD comprises a disc serving as a recording medium where data is recorded and stored, a spindle motor configured to rotate the disc at a high speed, and a head stack assembly (HSA) having a read/write head configured to record data onto the disc and read out data recorded on the disc.

The HSA rotates by a voice coil motor (VCM) around a rotation shaft, which acts as a pivoting shaft. The HSA includes an actuator arm rotatably coupled to the rotation shaft, a slider having a read/write head mounted thereon, and a suspension installed at the actuator arm and configured to support the slider to be elastically biased towards the surface of the disc. A sub-assembly of the read/write head, the slider, the suspension, etc. is called a Head Gimbal Assembly (HGA).

The suspension may include a base plate, a lload beam, a hinge for connecting the base plate and the load beam to each other, and a flexure. Especially, the end part of the flexure to which the slider is attached is called 'gimbal'. The gimbal is a very important part in relation to Pitch Static Angle (PSA), Roll Static Angle (RSA), and pitch/roll stiffness for stable flying of the slider.

The PSA indicates an angle between the loadbeam and the flexure in a pitching direction, and the RSA indicates an angle between the load beam and the flexure in a rolling direction.

Once the HDD is driven, the slider can be loaded on the disc from a ramp. For stable flying, the slider should be in a particular attitude. If an initial angle of the slider is out of the range of a preset value, problems may occur in regards to fly height and long term reliability.

The PSA and RSA are factors used determining an initial attitude of the slider when the slider flies. Accordingly, the PSA/RSA is strictly controlled to have specifications defined during Head Gimbal Assembly (HGA) processing for coupling the slider to the suspension, during Head Stack Assembly (HSA) processing for coupling the suspension to the actuator arm, etc., and so on.

In one example, the RSA has a median value of 0°, and the PSA has a constant target value. If the PSA is greater than the preset value, the fly height (FH) may be increased, and reliability may be lowered due to scratches generated when loading/unloading the head.

The PSA/RSA, an important specification of the suspension, is determined when manufacturing the suspension. However, the PSA/RSA may be severely changed during the HGA/HSA processing. In a serious case, the PSA/RSA may deviate from preset target values. In this case, it may be impossible to compensate for the PSA/RSA.

The discussion above is merely provided for general background information and is not intended to be used as an aid in determining the scope of the claimed subject matter.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Therefore, an aspect of the disclosure embodiments is to provide a head gimbal assembly (HGA) capable of enhancing component (HGA, HSA, etc.) yield and Hard Disc Drive (HDD) yield, by compensating for Pitch Static Attitude (PSA) and Roll Static Attitude (RSA) into preset target values through active compensation, and the HGA capable of enhancing impact resistance and long-term reliability by improving stability of flying a slider, and an HDD having the same.

To achieve these and other advantages as embodied and broadly described herein, there is provided a head gimbal assembly, comprising: a suspension including a flexure to which a slider is coupled, the slider having a read/write head mounted thereat, a load beam disposed at an upper part of the flexure, a base plate disposed close to the load beam, and a hinge for connecting the load beam and the base plate to each other; and at least one piezoelectric film coupled to the suspension in a spaced state from each other, and configured to control at least one of Pitch Static Attitude (PSA), an angle between the load beam and the flexure in a pitching direction, and Roll Static Attitude (RSA), an angle between the load beam and the flexure in a rolling direction, by being extended or contracted when current is applied thereto.

Said at least one piezoelectric film may be provided in one pair. And, the suspension may include a pair of head traces electrically connected to the read/write head, and a pair of piezoelectric film traces electrically connected to the pair of piezoelectric films.

The pair of head traces may include outriggers spaced from corner regions of the flexure in a lengthwise direction, and formed in an arc shape. The piezoelectric films may be disposed on the outriggers.

The flexure may include a first flexure body having a slider mounting portion for mounting the slider; a second flexure body spaced from the first flexure body; and a bridge for connecting the first flexure body and the second flexure body to each other. The piezoelectric films may be disposed on the bridge.

The suspension may further include a dielectric layer coupled to the flexure in the form of a thin film, formed of an electric insulating material, and configured to electrically insulate the head traces and the flexure from each other.

The piezoelectric film may include a piezoelectric layer extendable or contractable by current supplied thereto; an upper electrode layer formed of a metallic material, and coated on an upper part of the piezoelectric layer; and a lower electrode layer formed of a metallic material, and coated on a lower part of the piezoelectric layer.

The piezoelectric film may further include a zirconia (ZrO2) layer disposed at a lower part of the lower electrode layer; and a silicone (Si) substrate disposed at a lower part of the zirconia layer.

A piezoelectric device applied to the piezoelectric layer may be PZT (Lead Zirconate Titanate, Pb[Zrx Ti1-x]O3, 0<x<1), or may be a lead-free piezoelectric device having a structure of Perovskite.

The lead-free piezoelectric device having a structure of Perovskite may be selected from a group consisting of BT(BaTiO3), BNT((Bi1/2Na/2)TiO3) and KNN((K, Na)NbO3).

According to another aspect of the present disclosure, there is provided a hard disc drive, comprising: a disc; and a head gimbal assembly having a read/write head for recording data onto the disc or reading out data on the disc, wherein the head gimbal assembly includes: a suspension including a flexure to which a slider is coupled, the slider having a read/write head mounted thereat, a load beam disposed at an upper part of the flexure, a base plate disposed close to the load beam, and a hinge for connecting the load beam and the base plate to each other; and at least one piezoelectric film coupled to the suspension in a spaced state from each other, and configured to control at least one of Pitch Static Attitude (PSA), an angle between the load beam and the flexure in a pitching direction, and Roll Static Attitude (RSA), an angle between the load beam and the flexure in a rolling direction, by being extended or contracted when current is applied thereto.

Said at least one piezoelectric film may be provided in one pair. And, the suspension may include a pair of head traces electrically connected to the read/write head, and a pair of piezoelectric film traces electrically connected to the pair of piezoelectric films.

The pair of head traces may include outriggers spaced from corner regions of the flexure in a lengthwise direction, and formed in an arc shape. The piezoelectric films may be disposed on the outriggers.

The flexure may include a first flexure body having a slider mounting portion for mounting the slider; a second flexure body spaced from the first flexure body; and a bridge for connecting the first flexure body and the second flexure body to each other. The piezoelectric films may be disposed on the bridge.

The suspension may further include a dielectric layer coupled to the flexure in the form of a thin film, formed of an electric insulating material, and configured to electrically insulate the head traces and the flexure from each other.

The piezoelectric film may include a piezoelectric layer extendable or contractable by current supplied thereto; an upper electrode layer formed of a metallic material, and coated on an upper part of the piezoelectric layer; a lower electrode layer formed of a metallic material, and coated on a lower part of the piezoelectric layer; a zirconia (ZrO2) layer disposed at a lower part of the lower electrode layer; and a silicone (Si) substrate disposed at a lower part of the zirconia layer.

The present disclosure may have the following advantages.

Firstly, the PSA and RSA can be compensated, through active compensation, into a preset target value during a measurement process after Head Stack Assembly (HSA) processing. This can enhance component (HGA, HSA, etc.) yield and HDD yield.

Secondly, impact resistance and long-term reliability can be enhanced through improved stability of flying the slider.

Further scope of applicability of the present application will become more apparent from the detailed description given hereinafter. However, it should be understood that the detailed description and specific examples, while indicating some embodiments of the disclosure, are given by way of illustration only, since various changes and modifications within the scope of the disclosure will become apparent to those skilled in the art from the detailed description.

DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.
In the drawings.

DETAILED DESCRIPTION

Description will now be given in detail of the exemplary embodiments, with reference to the accompanying drawings. For the sake of brevity with reference to the drawings, the same or equivalent components will be provided with the same reference numbers, and a detailed description thereof will not be repeated.

Figure 1:
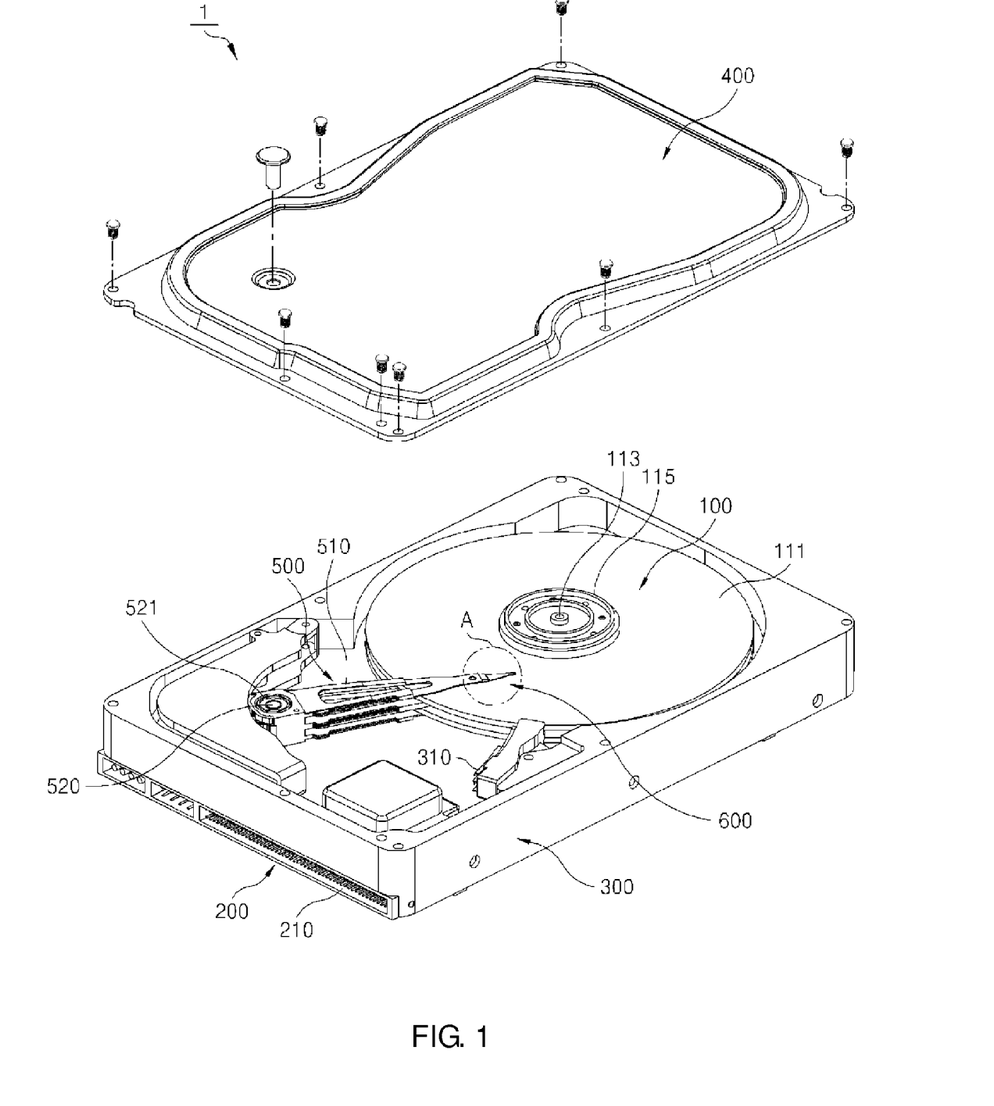
FIG. 1 is a disassembled perspective view of a hard disc drive (HDD) according to a first embodiment.
Figure 2:
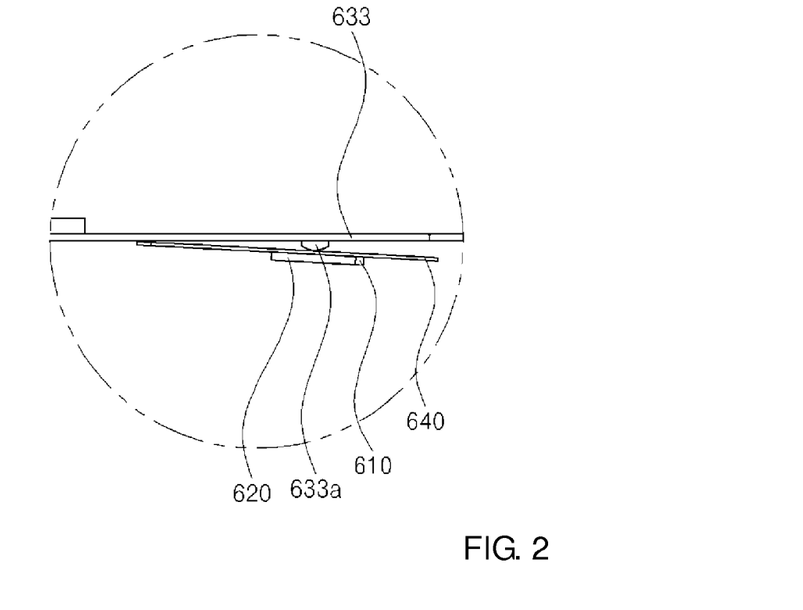
FIG. 2 is an enlarged lateral view of part 'A' of FIG. 1.
Figure 3:
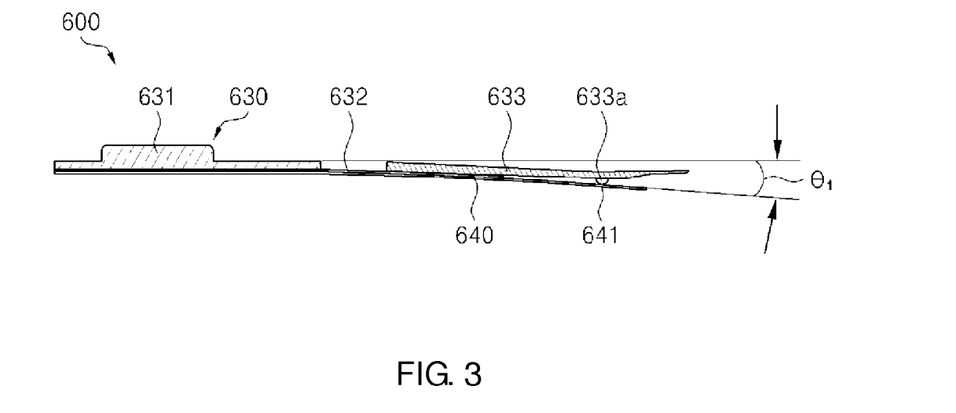
FIG. 3 is a lateral view of a main part of a head gimbal assembly (HGA) for explaining Pitch Static Attitude (PSA) in the HDD of FIG. 1.
Figure 4:
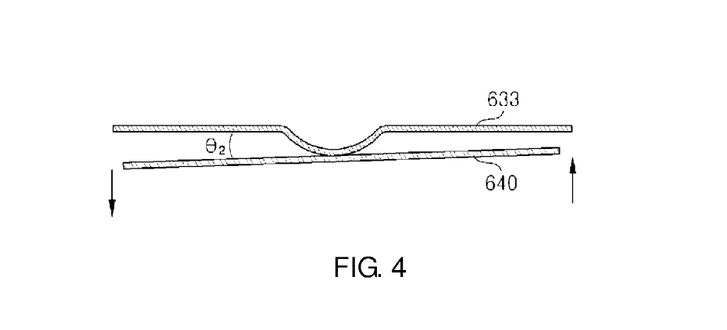
FIG. 4 is a lateral view of a main part of an HGA for explaining Roll Static Attitude (RSA) in the HDD of FIG. 1.
Figure 5:
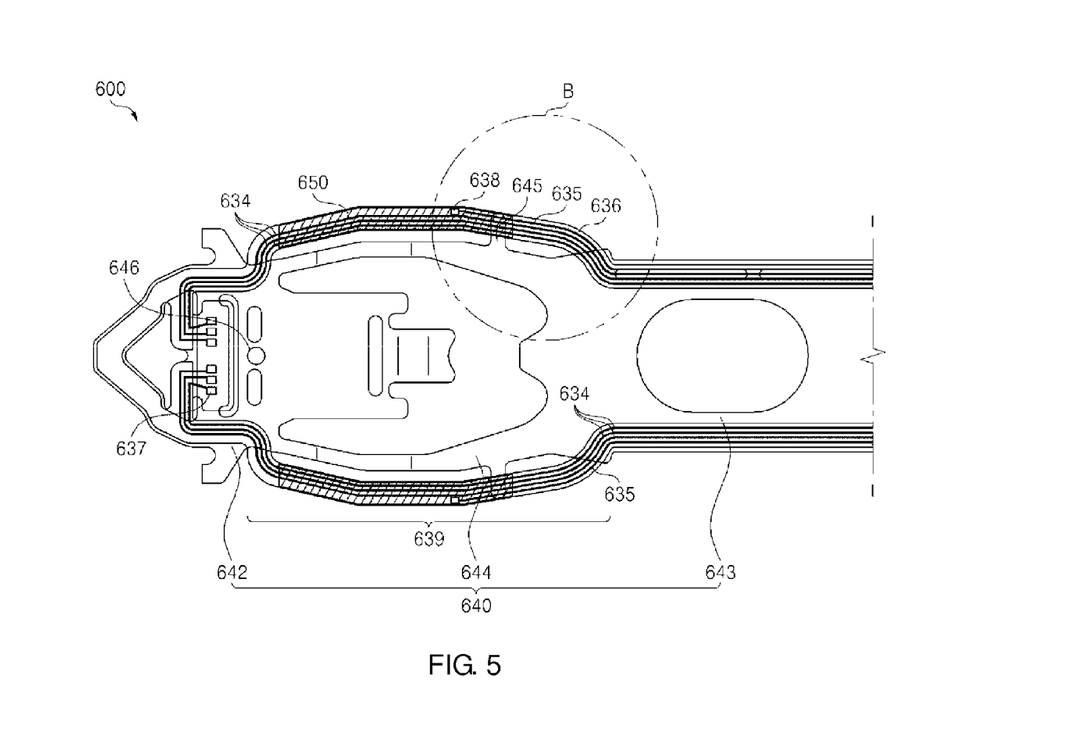
FIG. 5 is a planar view of a main part of an HGA in the HDD of FIG. 1.
Figure 6:
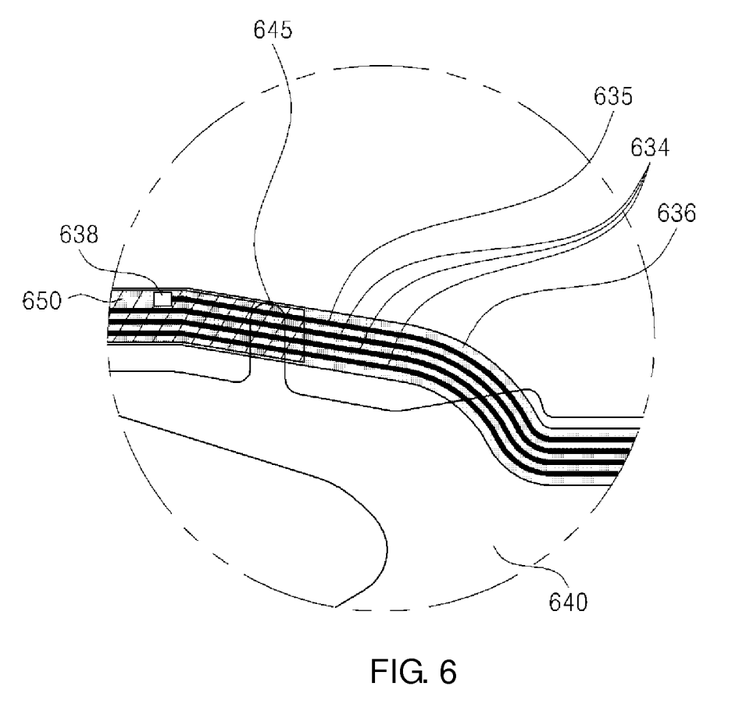
FIG. 6 is an enlarged view of part 'B' of FIG. 5.

FIG. 1 is a disassembled perspective view of a hard disc drive (HDD) according to a first embodiment, FIG. 2 is an enlarged lateral view of part 'A' of FIG. 1, FIG. 3 is a lateral view of a main part of a head gimbal assembly (HGA) for explaining Pitch Static Attitude (PSA) of the HDD of FIG. 1, FIG. 4 is a lateral view of a main part of the HGA for explaining Roll Static Attitude (RSA) of the HDD of FIG. 1, FIG. 5 is a planar view showing a main part of the HGA of the HDD of FIG. 1, and FIG. 6 is an enlarged view of part 'b' of FIG. 5.

As shown, a hard disc drive (HDD) 1 according to a first embodiment comprises a disc pack 100, a printed circuit board assembly (PCBA) 200, a base 300, a cover 400, and a head stack assembly (HSA) 500.

The disc pack 100 includes a shaft 113 serving as a rotation shaft of a disc 111, a spindle motor hub (not shown) disposed outside the shaft 113 in a radius direction and supporting the disc 111, a spindle motor (not shown) for rotating the spindle motor hub, a clamp 115 coupled to an upper part of the spindle motor hub, and a clamp screw (not shown) for fixing the disc 111 to the spindle motor hub by pressing the clamp 115.

The PCBA 200 includes a printed circuit board (PCB, not shown), and a PCB connector 210 disposed at one side of the PCB. A plurality of chips (not shown) and circuitry for controlling the disc 111 and a read/write head 610 are provided in the PCB. The PCB transmits and receives signals to/from the outside through the PCB connector 210.

At the base 300, the disc pack 100, the HSA 500, the PCBA 200, etc. are installed. Also, a ramp 310 for parking the read/write head 610 thereon when power supply is cut off is installed.

The cover 400 covers an upper surface of the base 300, thereby protecting the disc 111, the HSA 500, and so on.

The HSA 500 includes a head gimbal assembly (HGA) 600 having the read/write head 610 for recording data onto the disc 111 or reading out data on the disc 111, an actuator arm 510 which moves or pivots with respect to the disc 111 around a pivot shaft 520 as a pivoting center so that the read/write head 610 can access data on the disc 111, a pivot shaft holder 521 configured to rotatably support the pivot shaft 520, and to which the actuator arm 510 is coupled for support, and a bobbin (not shown) disposed at the pivot shaft holder 521 in the opposite direction to the actuator arm 510, and on which a voice coil motor (VCM) coil (not shown) is wound so as to be located between magnets (not shown).

The head gimbal assembly (HGA) 600 includes the read/write head 610, a slider 620 having the read/write head 610 mounted thereon, a suspension 630, and a pair of piezoelectric films 650 spaced from each other and coupled onto head traces 634 coupled to a flexure 640 of the suspension 630.

While the read/write head 610 records data onto the disc 111 or reads out data recorded on the disc 111, a lifting force by the rotation of the disc 111 and an elastic force of the suspension 630 are applied to the slider 620 having the read/write head 610 mounted thereon. The slider 620 maintains a lifted state from the surface of the disc 111 at a height where the lifting force and the elastic force are balanced.

The read/write head 610 of the slider 620 records data onto one or more tracks of the disc 111 or reproduces data recorded on the track of the disc 111, while maintaining a particular gap from the rotating disc 111.

As shown in FIGS. 3 and 5, the suspension 630 includes a flexure 640 to which the slider 620 having the read/write head 610 mounted thereon is coupled, a load beam 633 disposed at an upper part of the flexure 640, a base plate 631 disposed close to the load beam 633, a hinge 632 configured to connect the load beam 633 and the base plate 631 to each other, a pair of head traces 634 electrically connected to the read/write head 610, a pair of piezoelectric film traces 635 electrically connected to the pair of piezoelectric films 650, and a dielectric layer 636 formed of an electric insulating material and configured to electrically insulate the head traces 634 and the flexure 640 from each other.

The base plate 631 is formed of stainless steel having high resistance against corrosion. One side of the base plate 631 is connected to the actuator arm 510, whereas another side thereof is connected to the load beam 633 via the hinge 632. Like the base plate 631, the load beam 633 may be formed of stainless steel. One side of the load beam 633 is connected to the base plate 631 via the hinge 632. The load beam 633 is provided with a dimple 633a protruding towards the flexure 640, and a predetermined elastic force is provided to the flexure 640 through the dimple 633a.

The flexure 640 is formed of stainless steel. The flexure includes a first flexure body 642 having a slider mounting portion 646 for mounting the slider 620, a second flexure body 643 spaced from the first flexure body 642, and a bridge 644 for connecting the first flexure body 642 and the second flexure body 643 to each other. The bridge 644 is provided with protrusion supporting portions 645 protruding from at least one region of the bridge 644 in a direction perpendicular to a lengthwise direction of the bridge 644. The end of the flexure 640 to which the slider 620 is attached is called 'gimbal' 641 (refer to FIG. 3).

The protrusion supporting portions 645 are provided in one pair, and occupy part of the pair of head traces 634 which pass through corner regions of the flexure 640. The slider 620 having the read/write head 610 mounted thereon and disposed at a front end of the flexure 640 is mounted to the slider mounting portion 646.

The head traces 634 are electrically connected to the read/write head 610 so as to supply current to the read/write head 610. In this embodiment, the head traces 634 are formed of copper (Cu) having excellent electric conductivity. And, the head traces 634 are disposed on the dielectric layer 636 along two edges of the flexure 640 in a lengthwise direction, and extend up to the slider mounting portion 646.

More specifically, the head traces 634 are supported by the protrusion supporting portions 645 disposed at two sides of the flexure 640 through corner regions of the first flexure 642, and are spaced from corner regions of the flexure 640 by a particular distance in a lengthwise direction. Then, the head traces 634 extend up to the slider mounting portion 646, which are formed in a shape to enclose the outer periphery of the flexure 640. First pads 637 for electrically connecting the head traces 634 to the slider 620 are provided at the ends of the head traces 634.

The head traces 634 are provided with outriggers 639 spaced from the corner regions of the flexure 640 in a lengthwise direction, and formed in an arc shape. More specifically, the outriggers 639 of the head traces 634 are disposed in parallel along the bridge 644 of the flexure 640, and are spaced from the bridge 644 in a rigger shape.

The piezoelectric films 650 are disposed on the outriggers 639, and are extended or contracted when current is applied thereto through the piezoelectric film traces 635. As the piezoelectric films 650 are extended or contracted, the gimbal 641 of the flexure 640 minutely rotates with respect to the load beam 633. This may allow PSA and RSA to be controlled. Here, the PSA indicates Pitch Static Attitude (PSA, $\theta_1$), an angle between the load beam 633 and the flexure 640 in a pitching direction. And, the RSA indicates Roll Static Attitude (RSA, $\theta_2$), an angle between the load beam 633 and the flexure 640 in a rolling direction. This will be later explained in more detail.

The dielectric layer 636 is configured to electrically insulate the head traces 634 and the flexure 640 from each other. In this embodiment, the dielectric layer 636 is formed of polyimide resin.

The pair of piezoelectric film traces 635 are electrically connected to the piezoelectric films 650 so as to apply current to the piezoelectric films 650. In this embodiment, the piezoelectric film traces 635 are disposed in parallel to the pair of head traces 634 outside the head traces 634, based on a central shaft of the flexure 640 in a lengthwise direction. However, the present disclosure is not limited to this. More specifically, the piezoelectric film traces 635 may be disposed inside the head traces 634, as well as outside the head traces 634. In a case where the head trace 634 is provided in plurality like in this embodiment, the piezoelectric film traces 635 may be disposed between one head trace and another head trace.

Unlike the head traces 634, the piezoelectric film traces 635 do not extend up to the slider mounting portion 646 of the flexure 640, but are disposed at parts of the outriggers 639 thus to be electrically connected to the piezoelectric films 650. Second pads 638 for electrically connecting the piezoelectric film traces 635 to the piezoelectric films 650 are provided at the ends of the piezoelectric film traces 635.

The pair of piezoelectric films 650 are disposed on the outriggers 639 of the head traces 634 and are extended or contracted by current supplied thereto, thereby controlling PSA or RSA.

As shown in FIGS. 3 and 4, the PSA (Pitch Static Attitude, $\theta_1$) indicates an angle between the load beam 633 and the flexure 640 in a pitching direction, and the RSA (Roll Static Attitude, $\theta_2$) indicates an angle between the load beam 633 and the flexure 640 in a rolling direction.

Once current is supplied to the pair of piezoelectric films 650 symmetrically disposed on the outriggers 639, the piezoelectric films 650 are compressed or contracted. As a result, the gimbal 641 of the flexure 640 up-down rotates centering around one point, thereby controlling PSA ($\theta_1$, an angle between the load beam 633 and the flexure 640 in a pitching direction) and RSA ($\theta_2$, an angle between the load beam 633 and the flexure 640 in a rolling direction).

For instance, if the PSA deviates from a preset value during head gimbal assembly (HGA) processing and head stack assembly (HSA) processing, current is supplied to the pair of piezoelectric films 650 for extension or contraction thereof. As a result, the outriggers 639 to which the piezoelectric films 650 have been attached, and the gimbal 641 of the flexure 640 connected to the outriggers 639 relatively rotate with respect to the load beam 633. This may allow PSA to be compensated into a preset value.

The protrusion supporting portions 645 for supporting the head traces 634 may serve as shafts for supporting the head traces 634 in a pitching direction, according to an extended or contracted state of the piezoelectric films 650. More concretely, the piezoelectric films 650 may be extended in a lengthwise direction to increase PSA, whereas the piezoelectric films 650 may be contracted in a lengthwise direction to decrease PSA.

When current is supplied to one of the two piezoelectric films 650 symmetrically disposed at the flexure 640, or when different currents are supplied to the two piezoelectric films 650, pitch motion is performed at one side of the gimbal 641 of the flexure 640 more than at another side thereof. This may cause roll motion, thereby controlling RSA.

The method for compensating for PSA or RSA by extending or contracting the piezoelectric films 650 are very effective to compensate for PSA or RSA changed after HGA processing and HSA processing into a preset value.

Figure 7:
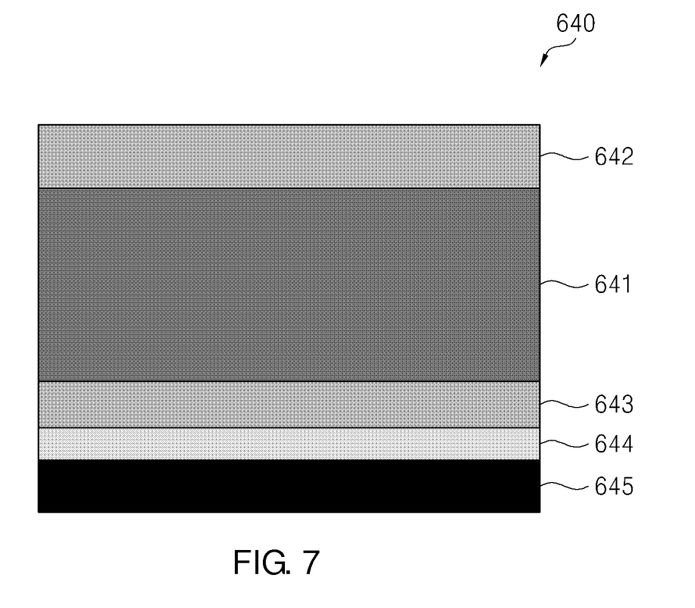
FIG. 7 is a lateral view showing a structure of piezoelectric films of FIG. 5.

As shown in FIG. 7, the piezoelectric film 650 is formed by sequentially laminating a silicone substrate 645, a zirconia layer 644 (ZrO2), a lower electrode layer 643, a piezoelectric layer 641, and an upper electrode layer 642.

The silicone substrate 645 may support the zirconia layer 644 (ZrO2), the lower electrode layer 643, the piezoelectric layer 641, and the upper electrode layer 642, and may electrically insulate the head traces 634 and the piezoelectric films 650 from each other.

The zirconia layer 644 (ZrO2) is disposed on the silicone substrate 645.

The lower electrode layer 643 is disposed on the zirconia layer 644 (ZrO2), and is configured to supply current to the piezoelectric layer 641. In this embodiment, the lower electrode layer 643 is formed of platinum (Pt). However, the present disclosure is not limited to this. That is, the lower electrode layer 643 may be formed of any metallic material having high electric conductivity and easily implemented as a thin film.

The piezoelectric layer 641 is implemented as a piezoelectric device, which is called 'Piezoelectric Element'. The piezoelectric device indicates a device for generating electrical charge outside by causing polarization therein due to a mechanical stress, or a device having mechanical deformation by an external electric field. The piezoelectric device has an asymmetric crystalline structure for an enhanced piezoelectric effect. Generally, the piezoelectric device is formed of quartz, tourmaline, Rochelle salt, etc. However, the piezoelectric device may be formed of barium titanate being recently developed.

Preferably, the piezoelectric device applied to the piezoelectric layer 641 is formed of widely-used PZT (Lead Zirconate Titanate, Pb[Zrx Ti1-x]O3, 0<x<1) containing lead (Pb). Alternatively, the piezoelectric device may be selected from a group consisting of BT(BaTiO3), BNT((Bi1/2Na/2)TiO3) and KNN((K, Na)NbO3) each formed of a lead-free material and having a structure of Perovskite.

The upper electrode layer 642 is disposed on the piezoelectric layer 641, and a material and performance thereof are the same as those of the lower electrode layer 643.

Under this configuration, current is supplied to the pair of piezoelectric films 650 symmetrically disposed on the outriggers 639 through the piezoelectric film traces 635, so that the piezoelectric films 650 are compressed or contracted to control PSA and RSA. This may allow PSA or RSA changed after suspension assembly processing, HGA processing and HSA processing, to be compensated into a preset value during a measurement process, through active compensation. Accordingly, component (HGA, HSA, etc.) yield and HDD yield can be enhanced, and impact resistance and long-term reliability can be enhanced through improved stability of flying the slider.

Hereinafter, an HDD according to a second embodiment of the present disclosure will be explained with reference to the attached drawings. The same components as those of the first embodiment will not be explained for brevity.

Figure 8:
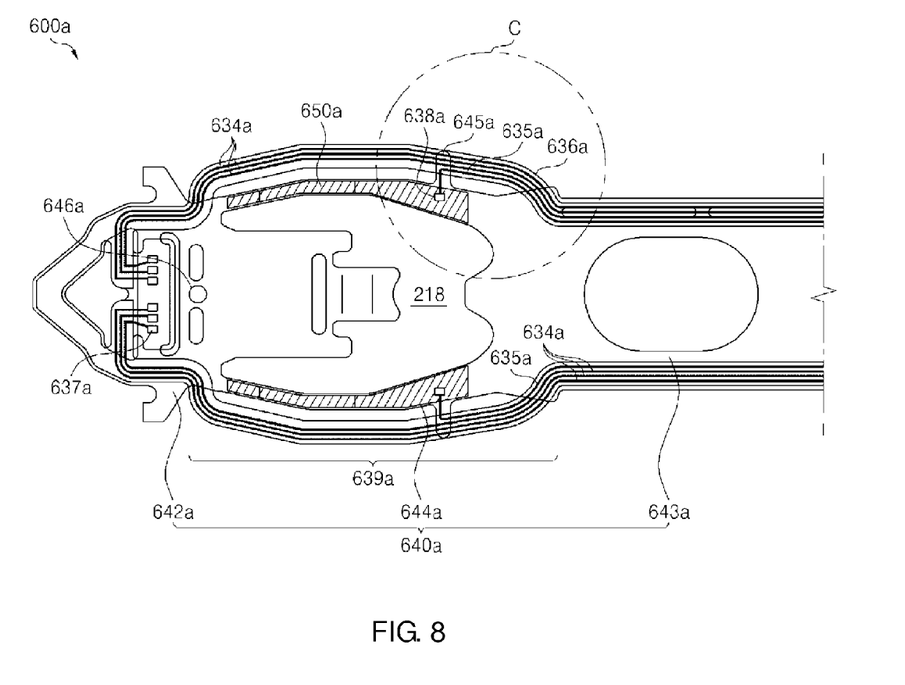
FIG. 8 is a planar view of a main part of an HGA in an HDD according to a second embodiment.
Figure 9:
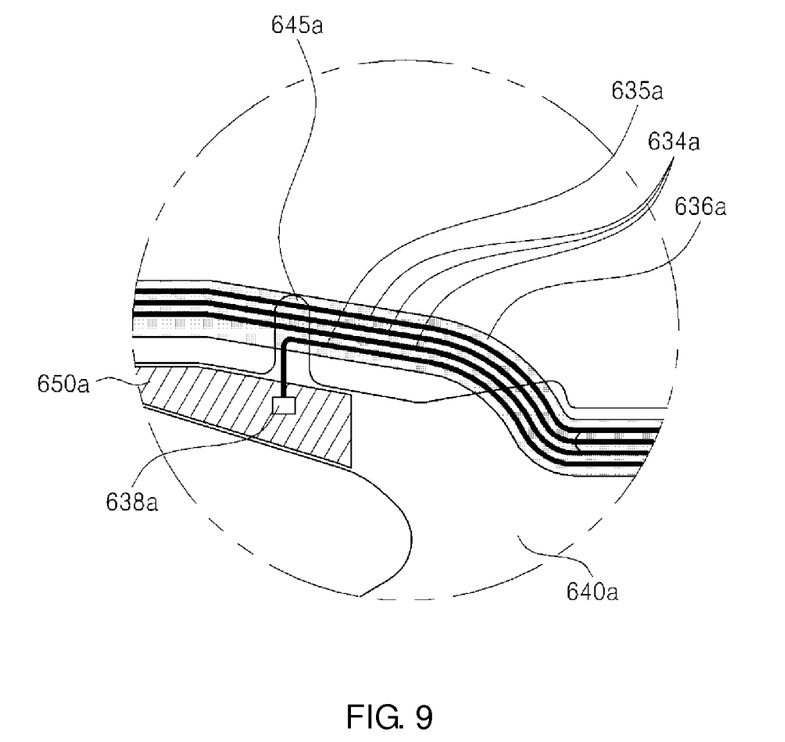
FIG. 9 is an enlarged lateral view of part 'C' of FIG. 8.

FIG. 8 is a planar view showing a main part of an HGA of an HDD according to a second embodiment of the present disclosure, and FIG. 9 is an enlarged lateral view of part 'C' of FIG. 8.

Unlike in the first embodiment, piezoelectric films 650a are disposed on a bridge 644a of a flexure 640a, not on outriggers 639a.

Once current is supplied to both of the pair of piezoelectric films 650a, the piezoelectric films 650a are extended or contracted. This may cause a gimbal (not shown) of the flexure 640a to perform pitch motion, thereby controlling PSA. On the other hand, if current is supplied to one of the pair of piezoelectric films 650a symmetrically disposed at the flexure 640a, or if different currents are applied to the piezoelectric films 650a, pitch motion is performed at one side of the gimbal of the flexure 640a more than at another side thereof. This may cause roll motion, thereby controlling RSA.

In the aforementioned embodiments, the piezoelectric films are provided in one pair. However, a single piezoelectric film may be provided so as to control one of PSA and RSA.

The foregoing embodiments and advantages are merely exemplary and are not to be construed as limiting the inventive concepts herein. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An assembly, comprising:
   a suspension including a flexure and a load beam disposed at an upper part of the flexure, the flexure including a first flexure body to which a slider is coupled, a second flexure body spaced apart from the first flexure body and a pair of bridges connecting the first flexure body to the second flexure body; and
   a piezoelectric microactuator coupled in its entirety to each of the bridges of the flexure and configured to control at least one of an angle between the load beam and the flexure in a pitching direction and an angle between the load beam and the flexure in a rolling direction by being extended or contracted when electrical current is applied thereto; and
   a plurality of traces disposed on a dielectric layer having a pair of outriggers that are supported by a pair of protrusion supporting portions that each extend from one of the pair of bridges of the flexure, the plurality of traces include traces for electrically connecting to a read/write head on the slider and traces for electrically connecting to the pair of piezoelectric microactuators; and
   wherein the traces that electrically connect to the pair of piezoelectric microactuators extend from the dielectric layer along the protrusion supporting portions to the piezoelectric microactuators located on the bridges.

2. The assembly of claim 1, wherein the outriggers are spaced from corner regions of the flexure in a lengthwise direction, and are formed in an arc shape.

3. The assembly of claim 1, wherein the dielectric layer comprises a thin film and is formed of an electric insulating material, the dielectric layer configured to electrically insulate the traces from the flexure.

4. The assembly of claim 1, wherein each piezoelectric microactuator includes:
   a piezoelectric layer extendable or contractable by the current supplied thereto;
   an upper electrode layer formed of a metallic material, and coated on an upper part of the piezoelectric layer; and
   a lower electrode layer formed of a metallic material and coated on a lower part of the piezoelectric layer.

5. The assembly of claim 4, wherein the piezoelectric microactuator further includes:
   a zirconia ($ZrO_2$) layer disposed at a lower part of the lower electrode layer; and
   a silicone (Si) substrate disposed at a lower part of the zirconia layer.

6. The assembly of claim 4, wherein the piezoelectric layer comprises one of a PZT (Lead Zirconate Titanate, Pb[Zr$_x$Ti$_{1-x}$]O$_3$, 0<x<1) and a lead-free structure of Perovskite.

7. The assembly of claim 6, wherein the lead-free structure of Perovskite is selected from a group consisting of BT(BaTiO$_3$), BNT((Bi1/2Na/2)TiO$_3$) and KNN((K, Na)NbO$_3$).

8. A memory device, comprising:
   a suspension comprising:
      a load beam;
      a flexure coupled to the load beam and to which a slider is mounted;
      a pair of piezoelectric microactuators each coupled in their entirety to the suspension, the pair of piezoelectric microactuators configured to control at least one of an angle between the load beam and the flexure in a pitching direction and an angle between the load beam and the flexure in a rolling direction by being extended or contracted when electrical current is applied thereto;
      a plurality of traces disposed on a dielectric layer for electrically connecting to a read/write head on the slider, the dielectric layer including a pair of outriggers each having a fixed portion that is in contact with one of a pair of protrusion supporting portions that extend from portions of the flexure and a free portion that is spaced apart from the flexure; and
      wherein the plurality of traces also include traces for electrically connecting to the pair of piezoelectric microactuators; and
      wherein each of the pair of piezoelectric microactuators, in their entirety, are coupled to and in contact with one of the free portions of the dielectric layer.

9. The memory device of claim 8, wherein the outriggers are spaced from corner regions of the flexure in a lengthwise direction and are formed in an arc shape.

10. The memory device of claim 8, wherein the flexure includes:
    a first flexure body having a slider mounting portion for mounting the slider;
    a second flexure body spaced from the first flexure body; and
    a pair of bridges for connecting the first flexure body and the second flexure body to each other, and
    wherein each protrusion supporting portion extends from one of the bridges.

11. The memory device of claim 10, wherein each of the pair of piezoelectric microactuators, in their entirety, are coupled to and in contact with one of the bridges of the flexure.

12. The memory device of claim 8, wherein the dielectric layer comprises an electric insulating material and is configured to electrically insulate the traces from the flexure.

13. The memory device of claim 8, wherein each piezoelectric microactuator includes:
    a piezoelectric layer extendable or contractable by the electrical current supplied thereto;
    an upper electrode layer formed of a metallic material, and coated on an upper part of the piezoelectric layer;
    a lower electrode layer formed of a metallic material, and coated on a lower part of the piezoelectric layer;
    a zirconia ($ZrO_2$) layer disposed at a lower part of the lower electrode layer; and
    a silicone (Si) substrate disposed at a lower part of the zirconia layer.

14. A suspension comprising:
    a load beam;
    a flexure coupled to the load beam and including a slider mounting portion for receiving a slider;
    a plurality of traces disposed on a dielectric layer for electrically connecting to a read/write head on the slider, the dielectric layer including a pair of outriggers each having a fixed portion that is in contact with one of a pair of protrusion supporting portions that extend from portions of the flexure and a free portion that is spaced apart from the flexure; and
    a piezoelectric microactuator coupled in its entirety to each of the free portions of the dielectric layer, the piezoelectric microactuators configured to rotate the slider mounting portion of the flexure relative to the load beam; and
    wherein the plurality of traces also include traces for electrically connecting to the piezoelectric microactuators.

15. The suspension of claim 14, wherein the piezoelectric microactuators rotate the slider mounting portion relative to the load beam to adjust an angle between the load beam and the flexure in a pitching direction.

16. The suspension of claim 14, wherein at least one of the piezoelectric microactuators rotates the slider mounting portion relative to the load beam to adjust an angle between the load beam and the flexure in a rolling direction.

17. The suspension of claim 14, wherein each of the piezoelectric microactuators are located a spaced distance from each other.

18. A memory device, comprising:
   a suspension comprising:
      a load beam;
      a flexure coupled to the load beam and to which a slider is mounted, wherein the flexure includes a first flexure body having a slider mounting portion for mounting the slider, a second flexure body spaced from the first flexure body and a pair of bridges for connecting the first flexure body and the second flexure body to each other, wherein each protrusion supporting portion extends from one of the bridges;
      a pair of piezoelectric microactuators each coupled in their entirety to and in contact with one of the bridges of the flexure, the pair of piezoelectric microactuators configured to control at least one of an angle between the load beam and the flexure in a pitching direction and an angle between the load beam and the flexure in a rolling direction by being extended or contracted when electrical current is applied thereto;
      a plurality of traces disposed on a dielectric layer for electrically connecting to a read/write head on the slider, the dielectric layer including a pair of outriggers each having a fixed portion that is in contact with one of a pair of protrusion supporting portions that extend from portions of the flexure and a free portion that is spaced apart from the flexure; and
   wherein the plurality of traces also include traces for electrically connecting to the pair of piezoelectric microactuators.

* * * * *